United States Patent [19]

Fowler et al.

[11] Patent Number: 5,596,312
[45] Date of Patent: Jan. 21, 1997

[54] SEAT BUCKLE ALARM

[76] Inventors: David C. Fowler, 210 Oak St., Surgoinsville, Tenn. 37873; Dale D. Cummings, Star Rte. 206-B, Hwy. 52, Dawsonville, Ga. 30534

[21] Appl. No.: 382,490

[22] Filed: Feb. 1, 1995

[51] Int. Cl.⁶ ........................................ B60Q 1/00
[52] U.S. Cl. ................... 340/457.1; 200/61.58 B; 280/801.1
[58] Field of Search ................ 340/457.1; 200/61.58 R, 200/61.58 B; 280/801.1

[56] References Cited

U.S. PATENT DOCUMENTS

| | | | |
|---|---|---|---|
| 3,781,497 | 12/1973 | Stephenson | 200/61.58 B |
| 3,868,627 | 2/1975 | Lawwill | 200/61.58 B |
| 3,956,603 | 5/1976 | Fisher | 200/61.58 B |
| 4,754,105 | 6/1988 | Doty et al. | 200/61.58 B |

OTHER PUBLICATIONS

Preliminary search results (see attached).

*Primary Examiner*—Jeffery Hofsass
*Assistant Examiner*—Julie B. Lieu
*Attorney, Agent, or Firm*— Chase & Yakimo

[57] ABSTRACT

An alarm for engaging the tongue plate and buckle of a seat belt system. The alarm presents a housing having a latch for releasable engagement with the tongue plate as well as a tongue plate for engagement with the buckle of the seat belt system. An alarm circuit is activated by a dial which must be rotated and then depressed to release the tongue plate from the alarm. If the actions of dial rotation and depression are not accomplished within the time delay of the alarm circuit, the alarm will sound indicative of an attempted disengagement of the seat belt system.

18 Claims, 9 Drawing Sheets

5,596,312

SEAT BUCKLE ALARM

BACKGROUND OF THE INVENTION

This invention relates to a warning system for a vehicle seat belt system or the like and, more particularly, to an alarm designed to interface with an existing seat belt system.

The value of utilizing safety belts in a vehicle is widely accepted. Accordingly, during the transport of children the vehicle driver ideally verifies that the child's seat belt is in place. However, in some instances the child may subsequently remove the seat belt during vehicle travel without warning and in some instances interfere with the driver during vehicle movement. Of course, in those instances when the child has removed the seat belt, the child is at risk during a subsequent vehicle mishap.

Although various systems have been proposed and/or adopted to indicate whether a seat belt is engaged, such systems may not warn the driver that a seat belt has been subsequently disengaged particularly during vehicle movement. If not, the driver may be unaware that a child, particularly one in the back seat, has disengaged and/or removed the seat belt restraint.

In response thereto we provide an alarm device which easily interfaces with the existing seat belt system. The device includes alarm circuitry which is activated by a dial once the dial is moved to a position for disengaging the seat belt mechanism. A time delay in the alarm circuitry will enable an adult to disengage the seat belt without activating the alarm.

It is therefore a general object of this invention to provide an alarm device indicative of disengagement of the seat belt system.

Another object of this invention is to provide an alarm device, as aforesaid, which delays the alarm function to allow for supervised release of the seat belt.

Another object of this invention is to provide an alarm device, as aforesaid, which easily interfaces with existing vehicle seat belt systems.

Still another object of this invention is to provide an alarm device, as aforesaid, which supplements existing seat belt warning systems found in vehicles.

Still another object of this invention is to provide an alarm, as aforesaid, which is more readily operable by adults than young children.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
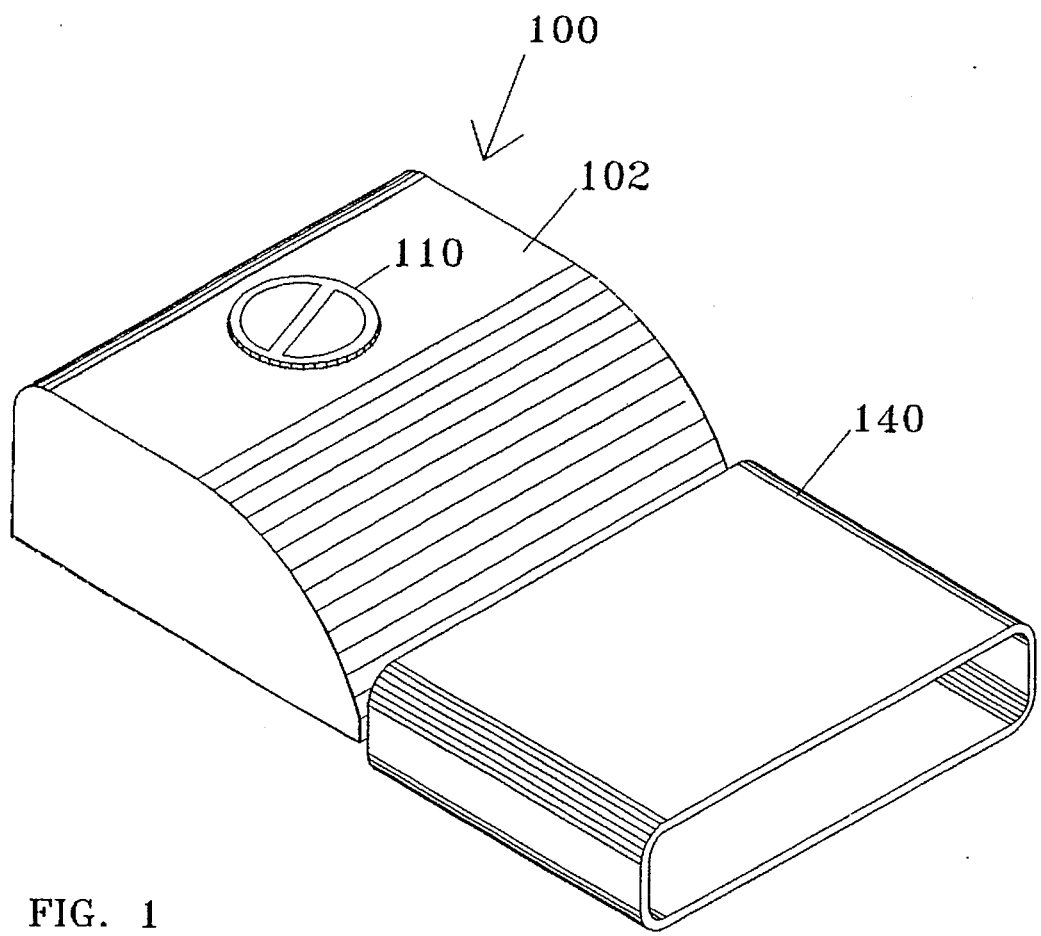
FIG. 1 is a perspective view of the seat belt alarm with a tongue plate shield in place.
Figure 2:
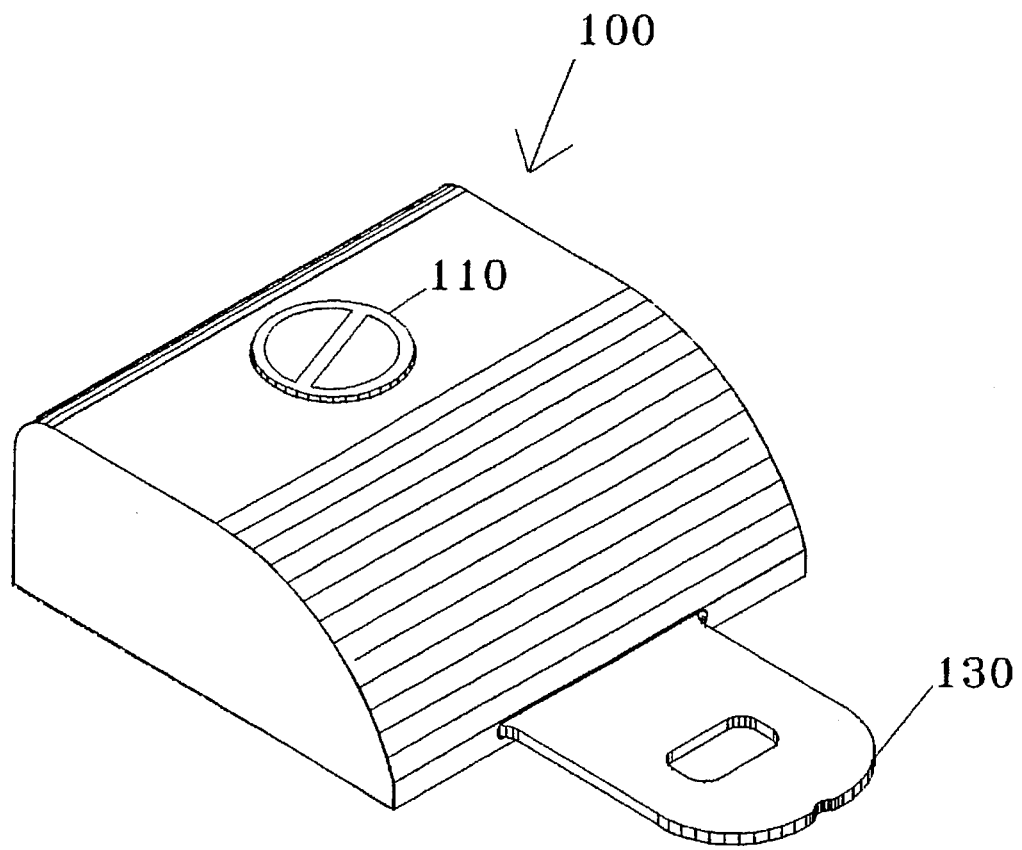
FIG. 2 is a perspective view of the device of FIG. 1 with the FIG. 1 shield removed.
Figure 3:
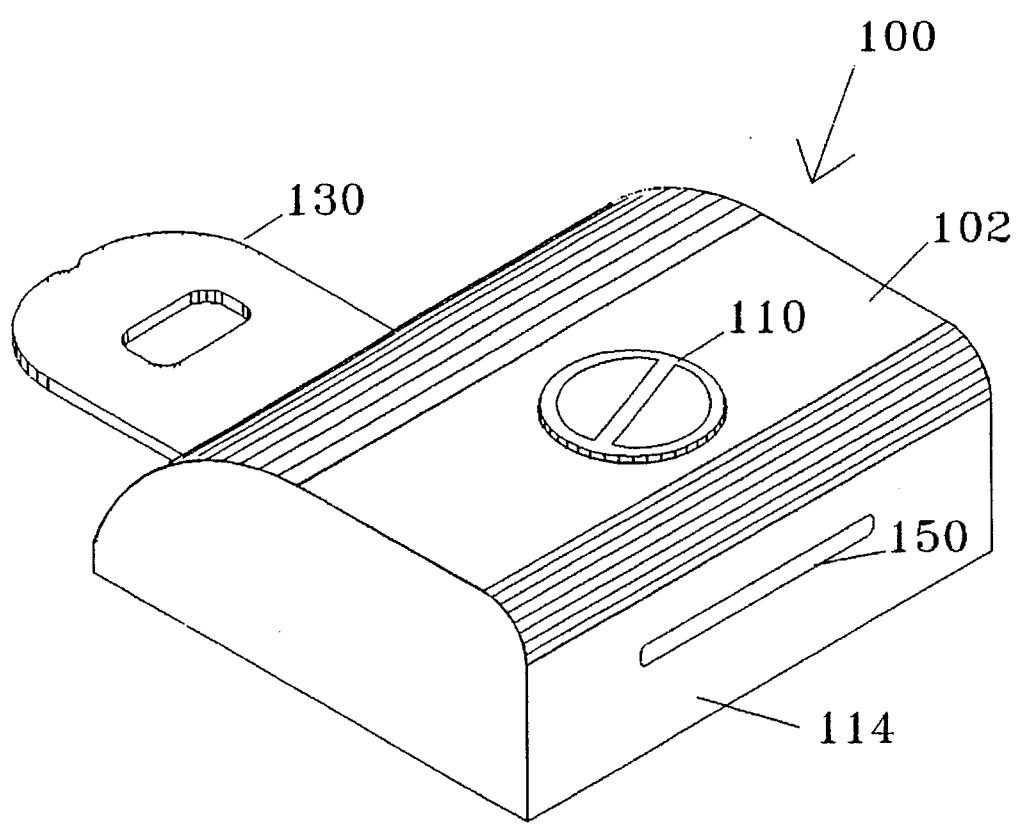
FIG. 3 is a perspective view of the alarm of FIG. 2 from the rear thereof.
Figure 4:
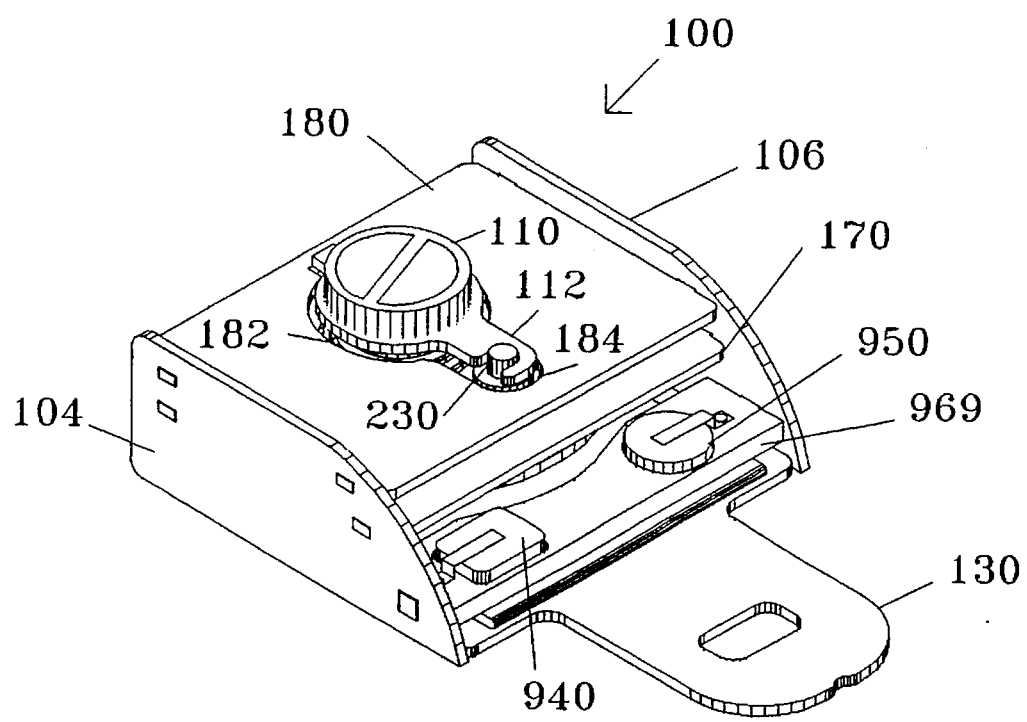
FIG. 4 is a perspective view of the alarm of FIG. 1 with the housing removed to show the interior elements.
Figure 5:
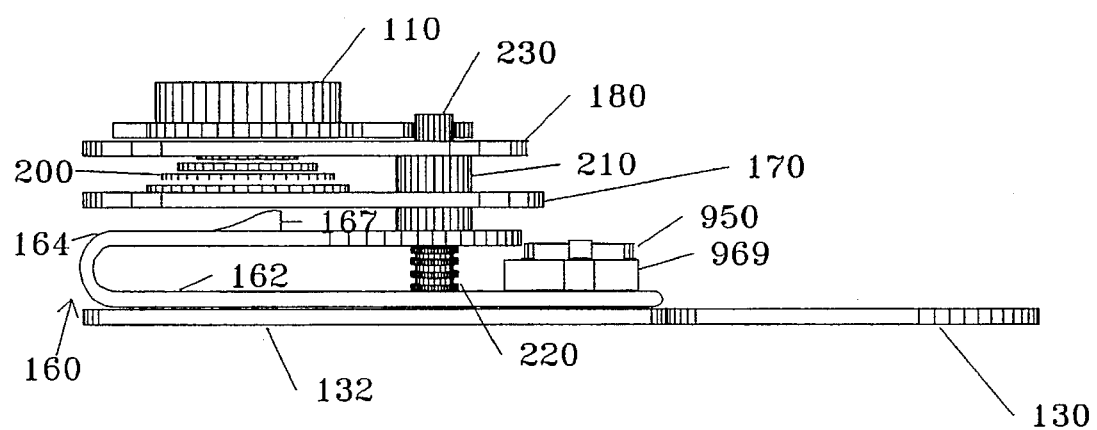
FIG. 5 is a side elevation view of the elements of FIG. 1 with the housing and side brackets removed.
Figure 6:
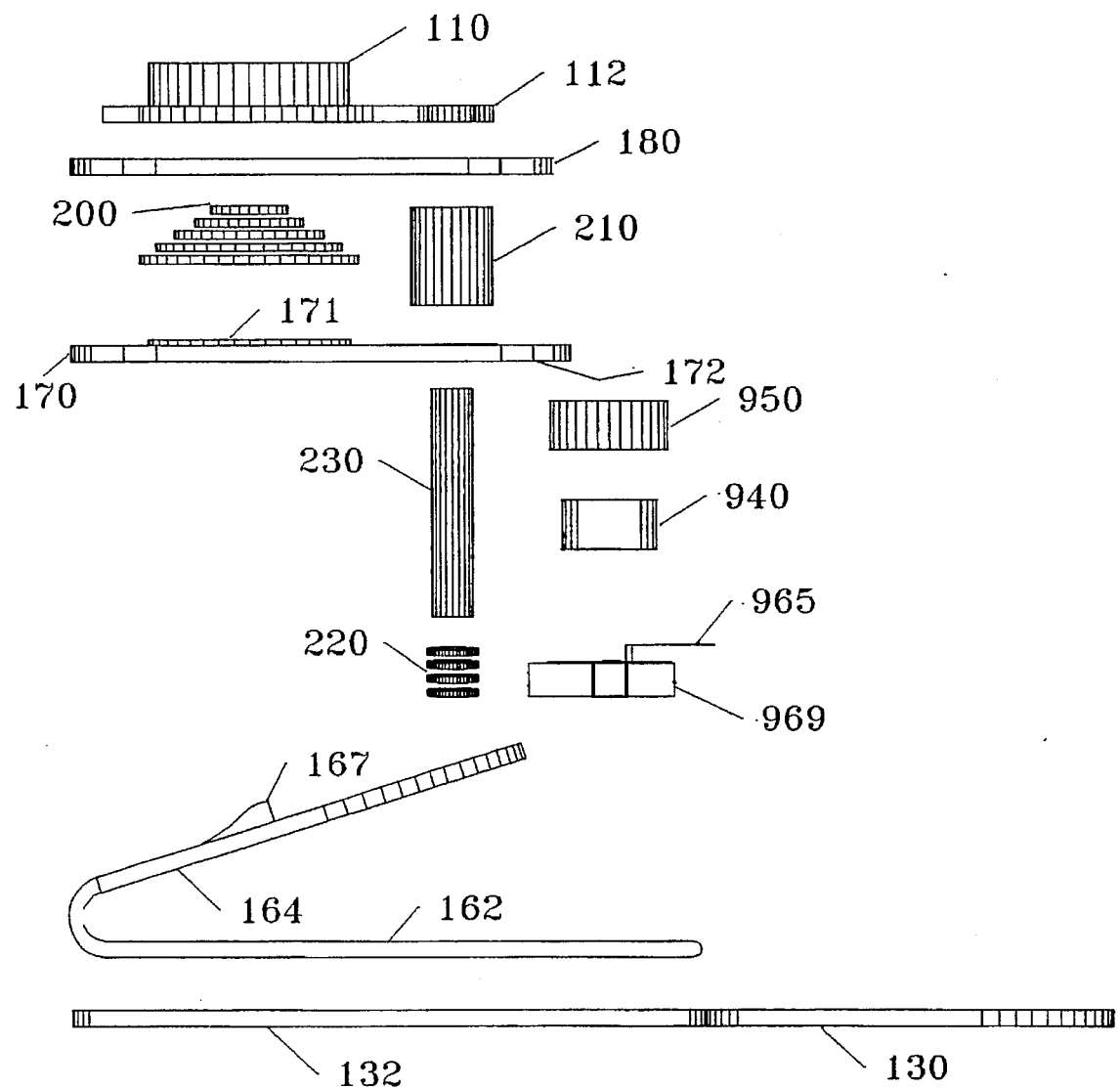
FIG. 6 is a side elevation view showing the elements of FIG. 5 in an exploded position.
Figure 7:
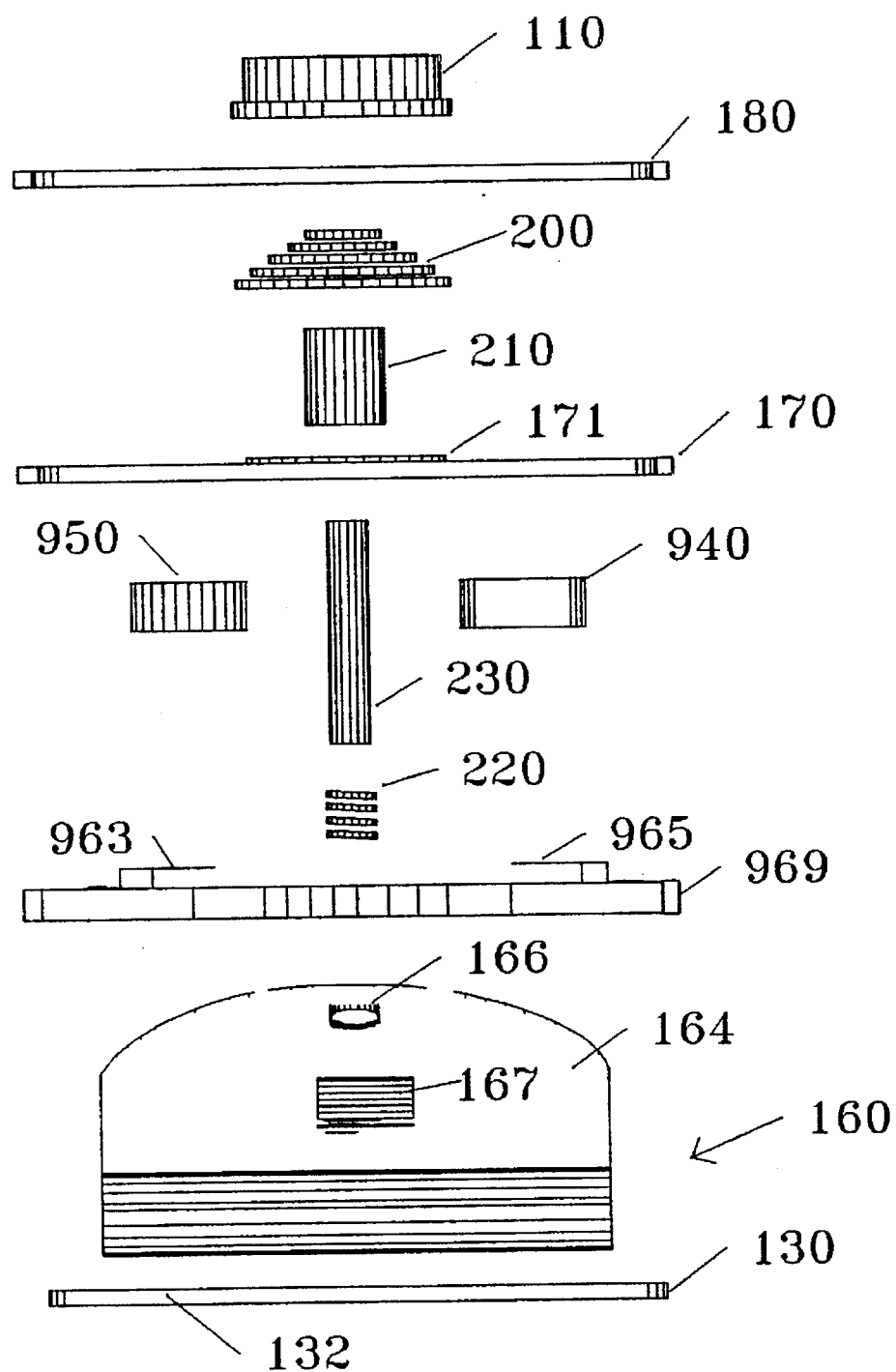
FIG. 7 is a rear, exploded view of the elements of FIG. 5.
Figure 8:
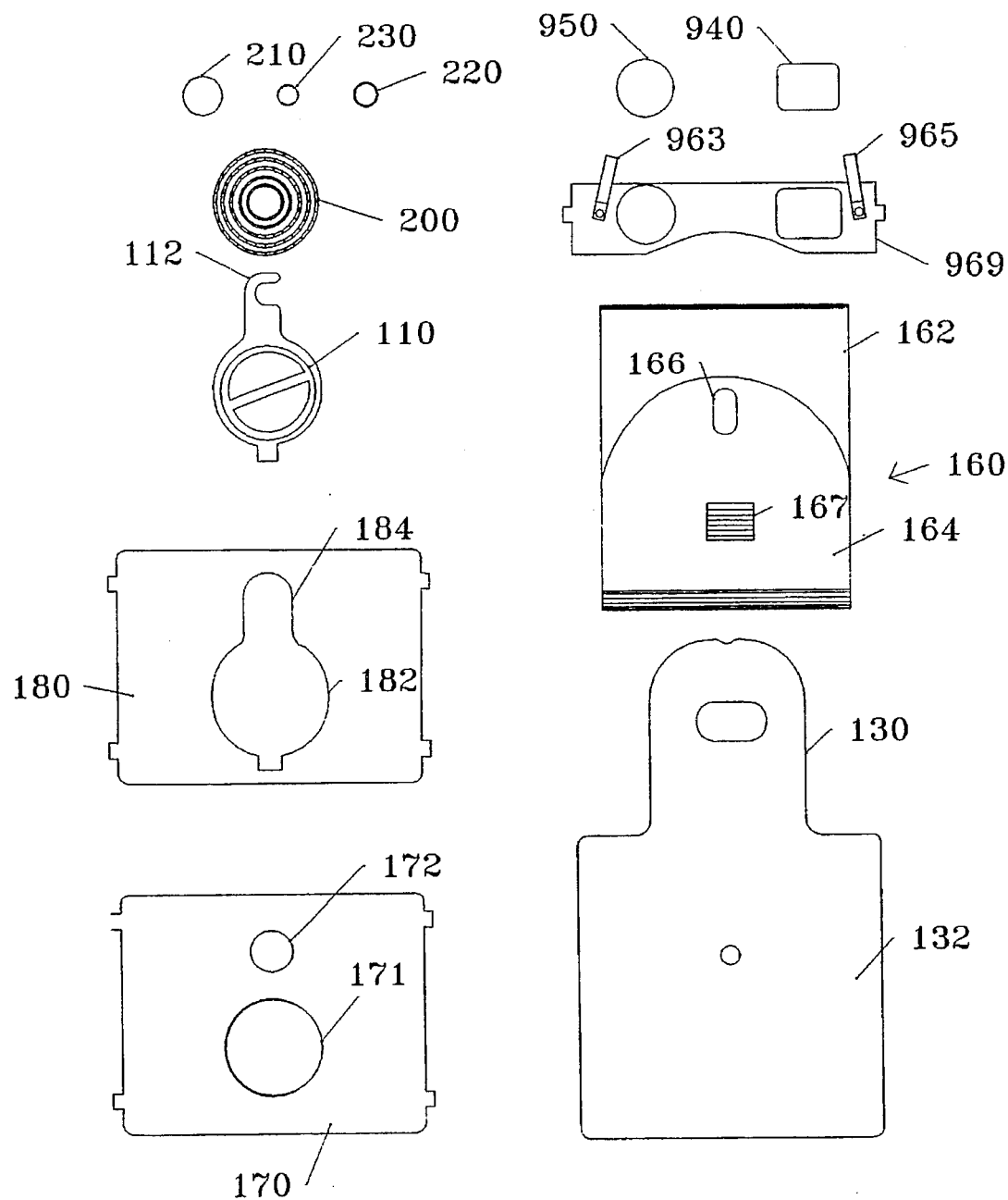
FIG. 8 is a top view of the elements within the housing.

Turning more particularly to the drawings, FIG. 1 illustrates the alarm 100 as generally comprising a housing 102 presenting a dial 110 on the top wall thereof. Extending from the housing is a tongue plate shield 140 for surrounding a tongue plate 130 extending from the housing 102 as shown in FIG. 2. Located on the rear wall 114 of the housing is a port 150 for insertion of the tongue plate of the vehicle safety belt system therethrough (not shown). Tongue plate 130 is configured for connection to the buckle of the vehicle safety belt system. Accordingly, it can be seen that the alarm 100 is an interface between the buckle and tongue plate of the conventional seat belt system.

Upon removal of housing 102, as best seen in FIGS. 4–8, the housing 102 includes side brackets 104, 106 containing therebetween the rearward extension 132 of the tongue plate 130. Located above the tongue plate is a latch mechanism 160 having a lower plate 162 and an upper plate 164, it being understood that the plate is preferably made of a resilient type of material. Extending through an aperture 166 in the latch plate 164 is a shaft 230 having wound about its lower end a spring 220.

Atop plate 164 and around the shaft 230 is a bushing 210 which extends through an aperture 172 in an overlying spring plate 170. The top surface of bushing 210 contacts the overlying dial plate 180 with the top of shaft 230 extending through the key portion 184 of aperture 182.

Positioned between a seat 171 in spring plate 170 and dial plate 180 is a spring 200. Spring 200 is connected to the dial 110 which is rotatably mounted atop the plate 180. Spring 200 urges the plate dial 110 into a first position in which the dial vertically extends through the housing. The spring 200 may also urge the dial 110 in rotation away from a FIG. 1 position. At the FIG. 1 position the aperture 182 in plate 180 surrounds the dial 110. In a second position the hook 112 of the dial 110 extends beyond an edge of the surrounding aperture 182.

Figure 9:
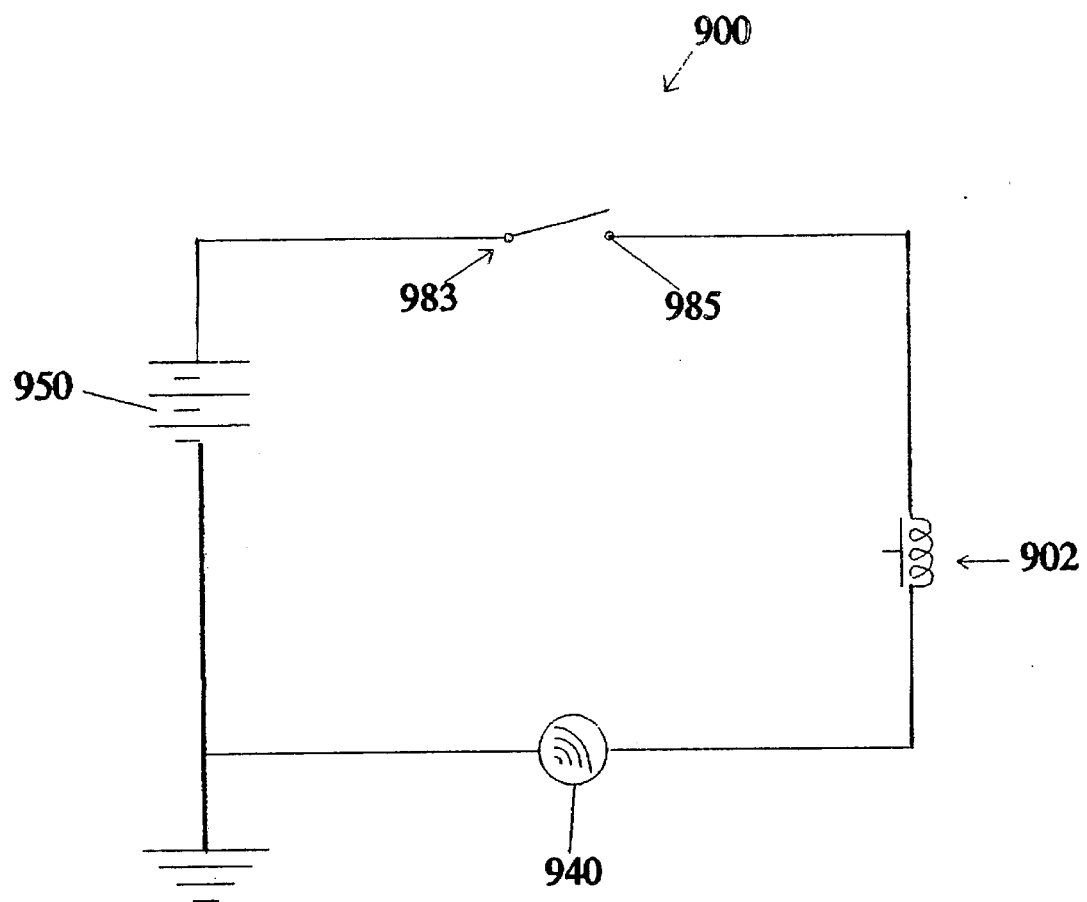
FIG. 9 is a schematic view showing one form of circuitry utilized in the alarm.

Further mounted within the housing 102 is a circuit 900, schematically shown in FIG. 9, the circuit 900 with alarm 940 being powered by a battery 950 mounted to a component bracket 969 which is positioned atop an end of the latch plate 162. Further located within the circuitry 900 is a time delay relay 902. Thus, upon closure of circuit 900 current is not immediately delivered to alarm 940 the delay being according to the type of relay 902 chosen. Terminals 963, 965 on component plate 964 receive wiring having free ends 983, 985 (FIG. 9) adjacent the bottom of dial 110. Along the bottom of the dial 110 is a conductive surface which contacts the free ends 983, 985 when the dial 110 is rotated to its FIG. 1 position. At this position the circuit 900 is closed.

In use the tongue 130 is inserted into the buckle of the vehicle seat belt system with the tongue (not shown) of the vehicle seat belt system being inserted through aperture 150 and between latch plate 164 and spring plate 170. Upon such insertion the top latch plate 164 is depressed. This movement allows the latch 167 on the plate 164 to enter the aperture commonly found in the tongue plate of vehicle seat belt systems. At such position the plate 164 returns to its normal position, as aided by its resiliency and the spring 220 bias. Upon return of the plate 164 to its normal position, latch 167 is captured within the aperture in the tongue of the vehicle seat belt. At this position the vehicle seat belt is secured about the child or child carrier with tongue plate 130 engaging the buckle of the vehicle seat belt system. As the dial 110 is preferably biased to a non-FIG. 1 position the circuit 900 is open so that no alarm 940 sounds.

To remove the vehicle tongue plate from the alarm 100, the dial 110 must first be rotated so that dial 110 lies wholly within aperture 182. At this position dial 110 may be downwardly depressed through the housing 102 and underlying aperture 182. Upon downward pressure being exerted on the dial 110, forces are exerted on the shaft bushing 210 and onto the underlying latch plate 164. Thus, upon downward movement of plate 164, latch 167 will be removed from the aperture of the vehicle's tongue plate. This position allows for removal of the vehicle tongue plate from aperture 150.

However, at this FIG. 1 position the conductive surfaces underlying dial 110 closes the circuit of FIG. 9. This closure will cause the alarm 940 to sound unless the dial 110 is allowed to rotate to its normal open position, i.e. a position other than the FIG. 1 position. Such dial 110 rotation is preferably urged by the bias of the spring 200. At this normal position no effective downward pressure can be exerted on dial 110 which will move the latch 167 to a position out of engagement with the vehicle tongue. This constraint arises as the hook 112 structure extends beyond the edges of the underlying aperture 182 or the underlying plate 180. Thus, the plate 180 will interfere with downward movement of dial 110.

Accordingly, the disengagement of the seat belt requires the dial 110 to be first rotated to its FIG. 1 position and then depressed. The dial 110 thus acts not only as a switch in circuit 900 but also as plunger which moves the latch 167 from the seat belt tongue plate. Once the vehicle tongue plate is removed, dial 110 will rotate to its normal position so as to open the FIG. 9 circuit. These actions of rotation and depression must be accomplished within the time delay afforded by relay 902 which is more easily accomplished by an adult than a young child's motor skills. Thus, if a child in a vehicle first turns the dial 110 to the FIG. 1 position and does not immediately depress dial 110 so as to disengage the latch 167 from tongue plate, the alarm 940 will sound unless the dial 110 is allowed to turn to a circuit open position. Accordingly, upon movement of the dial 110 to a FIG. 1 position by the child, the alarm will provide notice that an attempt is being made by the child to remove the seat belt restraint.

It is here noted that latch shield 140 prevents the child from manipulating the tongue plate 130 from the buckle of the vehicle seat belt system.

It is to be understood that while a certain form of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. An alarm for a vehicle seat belt system including a tongue plate at an end of one belt releasably engageable with a buckle on an end of another belt to form a restraint to secure a vehicle occupant, said alarm comprising:

a housing;

a first aperture in said housing for receiving the tongue plate of the vehicle seat belt system therein;

a tongue extending from said housing, said tongue releasably engageable with the buckle of the vehicle seat belt system;

an alarm positioned within a normally open circuit in said housing;

latch means in said housing for releasably engaging the vehicle tongue plate within said housing;

means for moving said latch means to a position out of engagement with the vehicle tongue plate, said moving means including structure for closing said normally open circuit, whereby to energize said alarm, said moving means comprising:

a second aperture in said housing;

a dial rotatably mounted within said housing aperture, said dial closing said circuit upon movement to a first position;

means in said housing for linking said dial with said latch means, said linking means moving said latch means out of engagement with the vehicle tongue plate upon rotation of said dial to said first position and movement of said dial away from said second housing aperture.

2. The system as claimed in claim 1 wherein said linking means comprises a shaft extending between said dial and said latch means, whereupon movement of said dial away from said second housing aperture moves said shaft and said latch means.

3. The system as claimed in claim 1 wherein said latch means comprises:

a latch plate in said housing adjacent said first housing aperture;

a latch on said plate, said latch plate urged in a first direction away from the vehicle tongue plate upon insertion of the tongue plate in said housing;

means for biasing said latch plate in a direction opposed to said first direction whereby to engage said latch with the vehicle tongue plate.

4. The system as claimed in claim 1 further comprising bias means connected to said dial, said bias means urging said dial towards said second aperture.

5. The system as claimed in claim 1 further comprising a bias means connected to said dial, said bias means urging said dial away from said first position closing said circuit.

6. The system as claimed in claim 1 further comprising:

a plate intermediate said dial and said latch means;

an aperture in said plate surrounding said dial when said dial is in said first position, said aperture presenting an edge underneath said dial when said dial is in a second position away from said first position, said aperture allowing for movement of said dial away from said second housing aperture in said first position and precluding movement of said dial away from said second housing aperture in said second position.

7. An alarm for a vehicle seat belt system including a tongue plate at an end of one belt releasably engageable with a buckle at an end of another belt to form a restraint to secure a vehicle occupant, said alarm comprising:

a housing;

an aperture in said housing for receiving the tongue plate of the vehicle seat belt system therein;

a tongue extending from said housing, said tongue releasably engageable with the buckle of the vehicle seat belt system;

an alarm positioned within a normally open circuit in said housing;

latch means in said housing for releasably engaging the vehicle tongue plate within said housing;

switch means in said housing for closing said normally open circuit, said switch means comprising a plunger presenting a free end movable between a first position extending exterior of said housing and a second position vertically displaced from said first position, said plunger moving said latch means from the vehicle tongue plate at said second position, said plunger having means thereon for closing said circuit at said second position to energize said alarm.

8. The system as claimed in claim 7 wherein said plunger free end comprises a rotatable dial extending through a surface of said housing, said dial having means thereon for closing said normally open circuit upon movement of said dial to said second position.

9. The system as claimed in claim 8 further comprising a plate within said housing presenting an aperture within said housing underneath said dial, said aperture having a configuration surrounding said dial at said second position, whereupon to allow movement of said plunger to said plunger second position upon depression of said dial through said plate aperture.

10. The system as claimed in claim 9 wherein said dial overlaps said plate aperture upon rotation of said dial to said first position whereupon to preclude movement of said dial and said shaft attached thereto to said second position.

11. The system as claimed in claim 7 further comprising bias means for urging said free end of said plunger to said first position.

12. The system as claimed in claim 8 further comprising a bias means for urging said dial away from said second dial position.

13. An alarm for a vehicle seat belt system including a tongue plate at an end of one belt releasably engageable with a buckle at an end of another belt to form a restraint to secure a vehicle occupant, said alarm comprising:

a housing;

an aperture in said housing for receiving the tongue plate of the vehicle seat belt system therein;

a tongue extending from said housing, said tongue releasably engageable with the buckle of the vehicle seat belt system;

an alarm positioned within a normally open circuit in said housing;

latch means in said housing for releasably engaging the vehicle tongue plate within said housing;

a shaft presenting a first end exterior of said housing and a second end within said housing for engagement with said latch means, said shaft being rotatable to a position for movement of said second end of said shaft into engagement with said latch means in a manner to move said latch means out of engagement with the tongue plate, said shaft including conductive means for closing said normally open circuit upon said movement to said position whereupon to energize said alarm.

14. An alarm for a vehicle seat belt system including a tongue plate at an end of one belt releasably engageable with a buckle on an end of another belt to form a restraint to secure a vehicle occupant, said alarm comprising:

a housing;

an aperture in said housing for receiving the tongue plate of the vehicle seat belt system therein;

a tongue extending from said housing, said tongue releasably engageable with the buckle of the vehicle seat belt system;

an alarm positioned within an open circuit in said housing;

latch means in said housing for releasably engaging the vehicle tongue plate within said housing, said latch means comprises:
  a latch plate in said housing adjacent said first housing aperture;
  a latch on said plate, said latch plate urged in a first direction away from the vehicle tongue plate upon insertion of the tongue plate in said housing;
  means for biasing said latch plate in a direction opposed to said first direction whereby to engage said latch with the vehicle tongue plate;

means for moving said latch means to a position out of engagement with the vehicle tongue plate, said moving means comprises:
  a second aperture in said housing;
  a dial rotatably mounted within said second housing aperture, said dial closing said circuit upon movement to said first position to energize said alarm;
  means in said housing for linking said dial with said latch plate, said linking means moving said latch plate in said first direction upon movement of said dial away from said second housing aperture, whereby to release said latch from the vehicle tongue plate.

15. The system as claimed in claim 14 wherein said linking means comprises a shaft extending between said dial and said latch plate, whereupon movement of said dial away from said second housing aperture moves said shaft and latch plate attached thereto.

16. The system as claimed in claim 14 further comprising bias means connected to said dial, said bias means urging said dial towards said second aperture.

17. The system as claimed in claim 14 further comprising a bias means connected to said dial, said bias means urging said dial away from said first position.

18. The system as claimed in claim 14 further comprising:
  a plate intermediate said dial and said latch means;
  an aperture in said plate surrounding said dial when said dial is in said first position, said aperture presenting an edge underneath said dial when said dial is in a second position away from said first position, said aperture allowing for movement of said dial away from said second housing aperture in said first position and precluding movement of said dial away from said second housing aperture in said second position.

* * * * *